United States Patent Office.

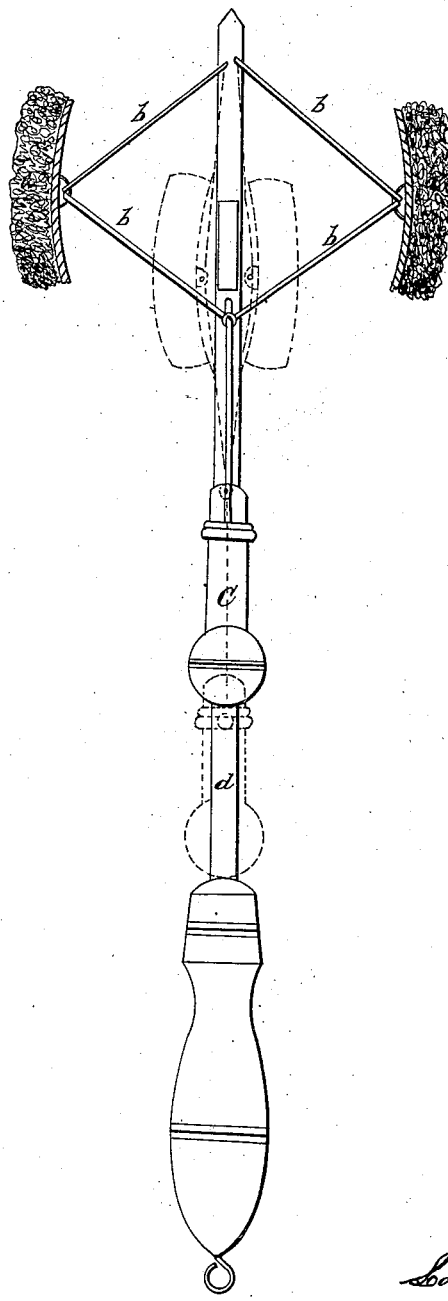

LORING J. BAKER, OF MACHIAS, ASSIGNOR TO SAMUEL D. LEAVITT, ARCHIBALD McNICHOL, AND FRANK FOWLER, OF PORTLAND, MAINE.

Letters Patent No. 77,567, dated May 5, 1868.

IMPROVED LAMP-CHIMNEY CLEANER.

The Schedule referred to in these Letters Patent and making part of the same.

TO ALL WHOM IT MAY CONCERN:

Be it known that I, LORING J. BAKER, of Machias, in the county of Washington, in the State of Maine, have invented a new and useful Improvement on a "Lamp-Chimney Cleaner;" and I do hereby declare that the following is a full, clear, and exact description of the construction and operation of the same.

To enable others to make and use my invention, I will proceed to describe its construction and operation.

This invention consists of a rod or shaft, $d$, supplied with a handle, above which is a loosely-fitting sleeve, $c$, to which are connected two pairs of toggle-joint levers or links $b\ b\ b\ b$. To the outer angles of these are attached wipers $a\ a$, operated by sliding the sleeve $c$ upon the rod or shaft $d$, thereby pressing the wipers $a\ a$ outward from the rod or shaft $d$, and moving them to or from the shaft, thus adjusting them to the varying diameters of the chimney.

What I claim as my invention, and desire to secure by Letters Patent, is—

The toggle-joint levers $b\ b\ b\ b$, operated by the sliding sleeve $c$, upon the rod or shaft $d$, substantially as and for the purpose as described.

LORING J. BAKER.

Witnesses:
    CHARLES E. INGLE.
    J. SARGENT.